United States Patent [19]

Mainardi

[11] Patent Number: 5,620,259
[45] Date of Patent: Apr. 15, 1997

[54] LINEAR GUIDE

[75] Inventor: Gianfranco Mainardi, Au, Switzerland

[73] Assignee: Doma Tech pneumatische Komponenten, Au, Switzerland

[21] Appl. No.: 655,467

[22] Filed: May 30, 1996

[30] Foreign Application Priority Data

Jun. 3, 1995 [CH] Switzerland ............... 01643/95

[51] Int. Cl.⁶ .................. F16C 29/04; F16C 29/12
[52] U.S. Cl. .................. 384/58; 384/53; 384/55; 384/57
[58] Field of Search ............... 384/49, 50, 52, 384/53, 55, 57, 58

[56] References Cited

U.S. PATENT DOCUMENTS

| | | | |
|---|---|---|---|
| 2,997,346 | 8/1961 | Beninger et al. | 384/58 X |
| 4,826,128 | 5/1989 | Schmeller | 384/55 X |
| 4,867,579 | 9/1989 | Gallone | 384/58 X |
| 5,012,874 | 5/1991 | Stridsberg | 384/58 X |

*Primary Examiner*—Thomas R. Hannon
*Attorney, Agent, or Firm*—Martin A. Farber

[57] ABSTRACT

A linear guiding apparatus comprises a rod having at least four guiding surfaces distributed over its periphery and extending in longitudinal direction of the rod. A carriage is arranged for a linear guided movement along the rod and has at least four rolls which engage a respective one of the guiding surfaces. Thus, the axis of each roll extends substantially in a direction perpendicular to the longitudinal axis of the rod, but is inclined with respect to a plane perpendicular to the respective guiding surface. In this way, the carriage is guided in axial direction of the rod by the rolls and is substantially free of torsion about the rod's longitudinal axis.

19 Claims, 1 Drawing Sheet ns,259

LINEAR GUIDE

FIELD OF THE INVENTION

This invention relates to a linear guiding apparatus comprising a rod and a carriage arranged for a linear guided movement along the rod.

BACKGROUND OF THE INVENTION

Linear guides are used in the field of robotics, but also in other fields of mechanics. In general, such linear guides consist of a rod arrangement and a carriage displaceable on the rod arrangement. Drive for displacing motion is imparted to the carriage either hydraulically or pneumatically, preferably with a cylinder-plunger-assembly, but also electrically, particularly by means of a linear motor. The rod arrangement comprises normally two guide rods of circular cross-section, penetrating ball sleeves of the carriage. The circular cross-section of the rods enables the smooth run provided by ball sleeves, but has the disadvantage that at least two rods have to be used in order to guide the carriage free of torsion about its guide rods. The constructional dimensions of a linear guide comprising at least two rods are relatively large, thus rendering difficult its use under narrow space conditions. A further drawback of ball sleeves resides in that the rods passing through them are not free of play.

SUMMARY OF THE INVENTION

It is an object of the present invention to provide a linear guide which is simple in construction, is free of torsion about the rod arrangement and requires less space than in the prior art.

This object is achieved by a linear guide apparatus in which the carriage has at least four rolls, while a single rod has at least four guiding surfaces. Each guiding surface is engaged by at least one roll of the carriage in such a manner that the axis of each roll extends substantially in a direction perpendicular to the longitudinal axis of the rod, but is inclined with respect to a plane perpendicular to the respective guiding surface. In this way, the carriage is guided in axial direction of the rod by the rolls engaging the guiding surfaces, and is substantially free of torsion about the rod's longitudinal axis.

According to a preferred embodiment, the rod has four guiding surfaces which are ground in a round rod, the surfaces being particularly ground as flat finished surfaces. Alternatively, the guiding surfaces are ground into a rod having at least four edges. Preferably, perpendicular planes onto two of said guiding surfaces are parallel to each other and form an angle of 90 degrees with two other ones of said guiding surfaces. It is preferred if the axis of at least one roll forms an angle of 45 degrees with a plane perpendicular to the guiding surface engaged by said roll.

The linear guides according to the invention exhibit the advantage to require only one rod, while, nevertheless warranting that the carriage does not turn about the axis of its displacing movement or about the rod's longitudinal axis. The use of only one rod results in small constructional dimensions of the linear guide as a whole, but also of the carriage.

BRIEF DESCRIPTION OF THE DRAWINGS

One embodiment of the invention will now be described with reference to the drawings given by way of example only, but not limiting the invention.

DETAILED DESCRIPTION OF THE DRAWINGS

Figure 1:
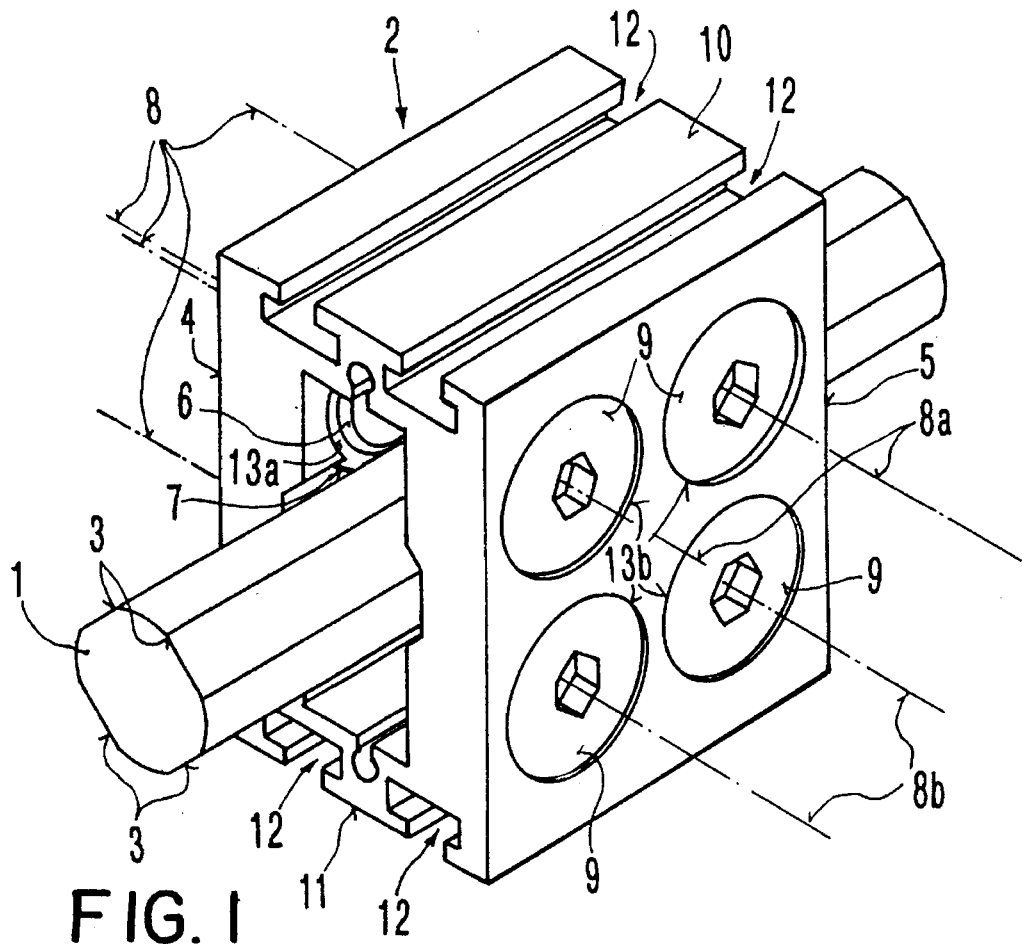
FIG. 1 is a perspective view of a linear guide comprising a carriage having eight rolls and four adjusting screws.

FIG. 1 shows a rod 1 passing through a carriage 2. The rod 1 is made from a hardened rod of circular cross-section by grinding and finishing four rolling or guiding surfaces 3 extending along the rod 1 which, thus, defines a longitudinal axis. The polished surface could either be a concave surface (in which case the perpendicular plane mentioned below intersects a tangent through the center), but is preferably a ground and finished flat surface. It has to be understood that, alternatively, rods of any cross-section, such as those having at least four edges could be used for manufacturing the rod 1. In the rod 1 shown, planes 16 perpendicular to the guiding surfaces 3 are indicated where a first pair of two opposite guiding surfaces 3 have their perpendicular planes 16 aligned (or at least parallel) relative to each other, while forming an angle of 90 degrees with those planes 16 of a second pair of perpendicular planes 16.

The carriage 2 is preferably formed by a housing 4, 5, 10, 11, as shown, cut off from a hollow section substantially rectangular in cross-section. This housing has a first wall 4 and a second wall 5 opposite to each other in each of which four rolls 6 (a first group of four rolls 6 being shown in FIG. 1 on the side of the wall 5, a pair of rolls 6 of a second group of four rolls journaled in wall 4 being represented in FIG. 2) are journaled in such a manner that they engage the guiding surfaces 3 of the rod 1 where they can roll along them. In order to mount the rolls 6 rotatably it is preferred to provide journals, particularly in the form of ball bearings 7, within first bores or recesses 13a and in second bores or holes 13b of the lateral walls 4 and 5, although it would also be possible to mount the rolls 6 rotatably about rigid axles. It is clear that openings 9 could also be provided instead of the recesses 13, and, theoretically recesses 13 could also replace the second bores 13b of wall 5, although it will be discussed below why through holes on at least one side are preferred.

In order to achieve a good guidance of the carriage 2 along the rod 1, it is favorable if the upper axes 8a of the journals 7 and the rolls 6, preferably aligned with each other, are arranged in a first, upper plane being parallel to a second lower plane in which the lower axes 8b, preferably aligned with each other, of the lower journals 7 and the rolls 6 extend. This means that it is preferred if the axes 8 of rolls 6 and journals 7 mounted in opposite lateral walls 4 and 5, and facing each other are in common.

According to a favorable characteristic, at least one of two rolls 6 facing each other or their respective journal 7 is adjustable along its axis 8a or 8b towards the rod 1 by an adjusting device, preferably comprising an adjusting screw 9. By adjusting the four rolls 6 of the group of lateral wall 5, for example, towards the rod 1, the rod 1 is engaged by both groups of rolls 6, i.e. by the groups of four rolls of each of walls 4 and 5, thus, eight rolls 6 in total, free of any play so that the carriage 2 can only move parallely to its own along the rod 1. In case where some play between the rod 1 and the carriage 2 would result from any wear of the guiding surfaces 3, such play could be removed by screwing the adjusting screws further in. The use of eight rolls 6 in total ensures an optimal alignment of the carriage 2 with the longitudinal axis defined by the rod 1. In case of restricted requirements to the precision of alignment, optionally four rolls 6 in total, i.e. a one upper and one lower roll 6 in each of the lateral walls 4 and 5, would be sufficient.

The housing has transverse third and fourth walls 10 and 11 in which T-grooves 12 are provided. The T-grooves form a fastening device accessible from outside for fastening any part desired. Of course, other fastening devices could be provided instead of (or in addition to) the T-grooves 12. Fastening means could be arranged on the lateral walls 4 or 5, although weight is better balanced when the fastening is situated on a transverse wall 10 and/or 11. If grooves are used, grooves with a quadrangular cross-section may also be employed where a part to be fastened, such as a hook, could be clamped. If desired, a cover may be provided on wall 5 so that the adjusting screws are not directly accessible. It is further favorable, if sealing elements (not shown) are located about the rod 1, thus sealing the opening formed by the hollow section of the housing of carriage 2 in order to prevent dust and dirt from entering the interior of the carriage 2.

Figure 2:
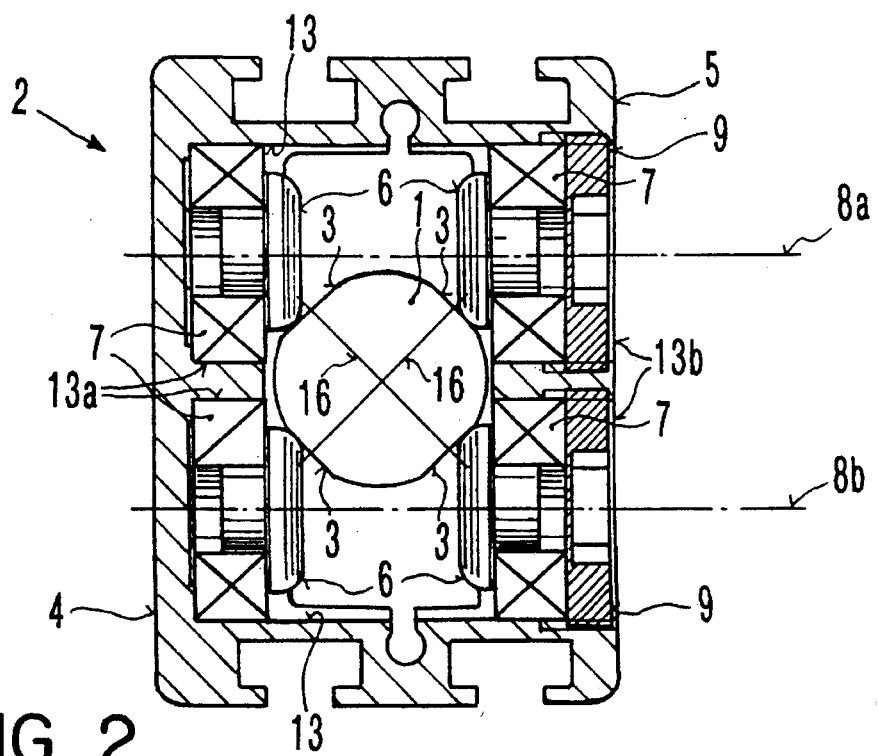
FIG. 2 is a cross-sectional view through the carriage and the rod along a plane perpendicular to the longitudinal axis of the rod.

FIG. 2 illustrates in a cross-sectional view of the carriage 2 and the rod 1 the simplicity and compactness of the construction, mainly of the carriage 2 itself. When manufacturing the carriage 2, a length of a hollow section is cut off, and then four blind holes 13 (or even through holes) are first completely bored through the lateral wall 5 to form the second bores 13b, and partially into the lateral wall 4 to form the first bores 13a. On the side of the lateral wall 5, threads are cut into the peripheral walls of the second bores 13b. Then the ball bearings 7 together with their rolls 6 are inserted through the lateral wall 5 and are press fitted into the first bores 13a of the opposite wall 4. Following this, the rod 1 is inserted into the carriage 2 and the rolls 6 and ball bearings 7 are inserted into the second bores 13b of lateral wall 5. In order to press the rolls 6 into tight engagement with the rod 1 and the respective guiding surfaces 3 thereof, the adjustment screws 9 are screwed in to the threads of the second bores 13b.

In the embodiment shown, the rotational axes 8a, 8b of the rolls 6 extend substantially in a direction perpendicular to that of the rod 1 and its longitudinal axis. At the same time, the rotational axes 8a, 8b form an angle of about 45 degrees with planes 16 which are perpendicular to the respective guiding surfaces 3. The inclined arrangement of the axes 8a, 8b in relation to the planes 16 perpendicular to the guiding surfaces 3 enables the carriage 2 to be free of any play or of any possibility to turn about the rod 1 by merely displacing at least one of the rolls 6 along its axis 8a or 8b towards the rod and the assigned guiding surface to engage the latter more tightly. In order to ensure good rolling characteristics of the rolls 6 along the rolling or guiding surfaces 3, the peripheral surfaces of the rolls 6, where they engage and contact the guiding surfaces 3, are suitably rounded.

What is claimed is:

1. A linear guiding apparatus comprising
   rod means having a peripheral surface and at least four guiding surfaces distributed over said peripheral surface and extending in longitudinal direction of said rod means, said longitudinal direction of said rod means defining a longitudinal axis;
   carriage means arranged for a linear guided movement along said rod means, said carriage means including:
      a roll arrangement comprising at least four rolls, each roll having an axis and engaging said guiding surface in such a manner that the axis of the respective roll extends substantially in a direction perpendicular to said longitudinal axis, but is inclined with respect to a plane perpendicular to the respective guiding surface; and
      journal means for said rolls;
   said carriage means being guided by said rolls engaging said guiding surfaces along said rod means, thereby being substantially free of torsion about said longitudinal axis.

2. Apparatus as claimed in claim 1, further comprising adjusting means for adjusting the relative position of at least one roll towards and away from said rod means for obtaining an engagement of said roll with its respective guiding surface free from play.

3. Apparatus as claimed in claim 2, wherein said journal means are displaceable in direction of said axis by said adjusting means.

4. Apparatus as claimed in claim 2, wherein said adjusting means comprise at least one adjusting screw.

5. Apparatus as claimed in claim 1, wherein at least two of said at least four rolls are arranged in pair on opposite sides of said rod, the rolls of said pair facing each other.

6. Apparatus as claimed in claim 5, wherein four of said rolls are arranged in two pairs, the rolls of each pair facing each other.

7. Apparatus as claimed in claim 5, further comprising adjusting means for adjusting at least one roll towards and away with respect to the other roll of the respective pair.

8. Apparatus as claimed in claim 1, wherein the rolls each pair have aligned axes.

9. Apparatus as claimed in claim 1, wherein the axes of at least two rolls are parallel to each other.

10. Apparatus as claimed in claim 1, wherein said journal means comprise ball means.

11. Apparatus as claimed in claim 1, wherein said carriage means comprise housing means formed by a hollow section.

12. Apparatus as claimed in claim 11, wherein said journal means comprise four pairs of journals, two pairs forming a first group arranged substantially within a first plane, and two other pairs forming a second group arranged substantially in a second plane, said groups facing each other,
    said hollow section comprises:
       first wall means bearing four journals of a first group; and
       second wall means facing said first wall means and including four holes which open towards the journals of said first group and receive said second group; and
    said roll arrangement comprise a first group of four rolls arranged substantially in a first plane, and a second group of four rolls facing said first group and being arranged in a second plane, the pairs of one of said groups being respectively located below and above said longitudinal axis.

13. Apparatus as claimed in claim 12, wherein said first wall means comprise four recesses for receiving said first group of journals, said recesses facing said holes.

14. Apparatus as claimed in claim 1, wherein said rod means comprise a round rod, said guiding surfaces being ground in said round rod.

15. Apparatus as claimed in claim 14, wherein said guiding surfaces are ground as flat finished surfaces.

16. Apparatus as claimed in claim 1, wherein perpendicular planes onto two of said guiding surfaces are parallel or in alignment to each other and form an angle of 90 degrees with two other ones of said guiding surfaces.

17. Apparatus as claimed in claim 1, wherein the axis of at least one roll forms an angle of 45 degrees with a plane perpendicular to the guiding surface engaged by said roll.

18. Apparatus as claimed in claim 1, wherein said carriage means further comprise at least one outer surface and fastening means on said outer surface.

19. Apparatus as claimed in claim 18, wherein said fastening means comprise at least one groove.

* * * * *